US009249901B2

(12) United States Patent
Sakamoto et al.

(10) Patent No.: US 9,249,901 B2
(45) Date of Patent: Feb. 2, 2016

(54) FUEL PIPE AND METHOD OF PRODUCTION OF SAME (75) Inventors: Shunji Sakamoto, Tokyo (JP); Toshio Tanoue, Tokyo (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 518 days.

(21) Appl. No.: 13/701,795

(22) PCT Filed: Jun. 3, 2011

(86) PCT No.: PCT/JP2011/062846
§ 371 (c)(1),
(2), (4) Date: Dec. 3, 2012

(87) PCT Pub. No.: WO2011/152537
PCT Pub. Date: Dec. 8, 2011

(65) Prior Publication Data
US 2013/0074971 A1  Mar. 28, 2013

(30) Foreign Application Priority Data

Jun. 3, 2010   (JP) .................................. 2010-128074
Mar. 10, 2011  (JP) .................................. 2011-053148

(51) Int. Cl.
*C22C 38/28* (2006.01)
*C22C 38/26* (2006.01)
(Continued)

(52) U.S. Cl.
CPC ............... *F16L 3/00* (2013.01); *C09D 5/4488* (2013.01); *C22C 38/28* (2013.01); *C25D 13/14* (2013.01); *F16L 3/237* (2013.01); *F16L 55/07* (2013.01); *F16L 58/00* (2013.01); *F02M 55/00* (2013.01); *Y10T 29/49826* (2015.01)

(58) Field of Classification Search
None
See application file for complete search history.

(56) References Cited

U.S. PATENT DOCUMENTS

2004/0256522 A1   12/2004   Takahashi et al.
2009/0053551 A1   2/2009    Sakamoto et al.
(Continued)

FOREIGN PATENT DOCUMENTS

JP    2004-330993 A    11/2004
JP    2004-359187 A    12/2004
(Continued)

OTHER PUBLICATIONS

English translation of Japanese patent 2006-137360A, Sakamoto Toshiharu et al., Jun. 1, 2006.*
(Continued)

*Primary Examiner* — Deborah Yee
(74) *Attorney, Agent, or Firm* — Birch, Stewart, Kolasch & Birch, LLP (57) ABSTRACT

A fuel pipe which is inexpensive and is excellent in salt spray corrosion resistance, characterized by being comprised of a steel pipe member having as a material a ferritic stainless steel which contains, by mass %, C: 0.015% or less, Si: 0.01 to 0.50%, Mn: 0.01 to 0.50%, P: 0.050% or less, S: 0.010% or less, N: 0.015% or less, Al: 0.010 to 0.100%, and Cr: 13.0 to 18.0% and further, one or both of Ti: 0.03 to 0.30% and Nb: 0.03 to 0.30% and a metal fitting part, the metal fitting part and the steel pipe member having between them a crevice structure at the surface which the structure is exposed to a salt spray environment, an opening amount at a crevice part of the crevice structure being 0.2 mm or more, and an inside of the crevice part being coated by electrodeposition.

12 Claims, 4 Drawing Sheets

(51) Int. Cl.
*F16L 3/00* (2006.01)
*F16L 55/07* (2006.01)
*F16L 58/00* (2006.01)
*C21D 8/10* (2006.01)
*F16L 3/237* (2006.01)
*C09D 5/44* (2006.01)
*C25D 13/14* (2006.01)
*F02M 55/00* (2006.01)

(56) References Cited

U.S. PATENT DOCUMENTS

2010/0139818 A1   6/2010   Ishii et al.
2010/0150770 A1   6/2010   Hiraide et al.

FOREIGN PATENT DOCUMENTS

| | | |
|---|---|---|
| JP | 2005-187878 A | 7/2005 |
| JP | 2006-137360 A | 6/2006 |
| JP | 2007-217775 A | 8/2007 |
| JP | 2008-190003 A | 8/2008 |
| JP | 2009-35813 A | 2/2009 |
| JP | 2009-68102 A | 4/2009 |
| JP | 2010-116619 A | 5/2010 |

OTHER PUBLICATIONS

International Search Report issued in PCT/JP2011/062846, mailed on Aug. 30, 2011.

* cited by examiner

A-A' CROSS SECTION

A-A' CROSS SECTION

FUEL PIPE AND METHOD OF PRODUCTION OF SAME

TECHNICAL FIELD

The present invention relates to a fuel pipe for automobile use and a method of production of the same. In particular, it relates to a fuel pipe which is made from a material less expensive than the current SUS436L and having a corrosion resistance corresponding to the currently used material.

BACKGROUND ART

A fuel pipe for automotive use is required under U.S. laws to have a guaranteed lifetime of 15 years or 150,000 miles. Fuel pipes made of stainless steel (SUS436L: 17Cr-1.2Mo) as materials have already been commercialized.

Automobiles which operate in the North American region are exposed to de-icing salt spray environments, so the materials which are used for the fuel pipes are required to have excellent salt spray corrosion resistance. In the past, SUS436L has been applied. However, due to the recent soaring prices of resources, demands have arisen for reducing the material costs. SUS436L contains the expensive Mo in about 1%, so even with just replacement by the Mo-free AISI439 steel (17Cr), a large effect of reduction of costs is obtained.

However, if cutting the alloying elements of a material, the corrosion resistance deteriorates. Therefore, the weak points due to lowering of the grade of the material require compensation by other methods.

The locations of a fuel pipe where corrosion is a concern are the crevice structures at the outer surface side of the fuel pipe which is exposed to a salt spray environment. In the past, as a means for improving the salt spray corrosion resistance of a crevice part in a crevice structure, coating by cationic electrodeposition has been used.

PLT 1 discloses a method of production which uses SUS436 pipe as a material and uses projection welding to assemble a fuel pipe and coats it by cationic electrodeposition. However, according to the findings of the inventors, with this art, the corrosion proofing cannot be said to be complete even with SUS436. Therefore, when using a lower grade material, it cannot be deemed that a sufficient corrosion proofing effect can be obtained by this art.

PLT 2 discloses the art of using SUS436 as a material so as to assemble a fuel pipe and coating the fuel pipe by electrostatic coating to prevent crevice corrosion.

PLT 3 shows the art of coating stainless steel fuel pipe by a chip-resistant coating so as to secure a sufficient corrosion proofing property even with chipping.

However, these arts involve higher coating costs than electrodeposition coating. On the other hand, the insides of crevices cannot be coated, so a sufficient corrosion proofing effect cannot be obtained.

Various corrosion proofing methods aside from coating have also been proposed.

PLT 4 discloses the art of placing sacrificial positive electrodes of zinc at the locations where passivation films are damaged by welding, brazing, plastic working, etc. in the assembly of stainless steel fuel pipes or at crevice locations and making use of sacrificial corrosion.

However, placing zinc at all of the locations where corrosion is a concern is troublesome and time-consuming. Further, zinc is an expensive metal. Furthermore, zinc is easily consumed in a salt spray environment, so the amount required soars. Therefore, in a fuel pipe, sacrificial corrosion cannot be said to be a realistic technique.

CITATIONS LIST

Patent Literature

PLT 1: Japanese Patent Publication No. 2002-242779 A1
PLT 2: Japanese Patent Publication No. 2004-21003 A1
PLT 3: Japanese Patent Publication No. 2006-231207 A1
PLT 4: Japanese Patent Publication No. 2005-206064 A1

SUMMARY OF INVENTION

Technical Problem

The present invention is predicated on use of a material of a lower grade than SUS436L and has as its object to secure corrosion resistance against salt spray, a weak point of stainless steel, in particular corrosion resistance in crevice structures.

Solution to Problem

The inventors came up with the idea that, as an inexpensive corrosion proofing method, the conventionally proven cationic electrodeposition coating would be optimal and thought that by specially adapting the electrodeposition coating and its coverage, it would be possible to enhance the corrosion proofing property and cash in that effect for a lower grade of material.

Therefore, first, they investigated the state of formation of coating films inside of crevices of fuel pipes made of SUS436L which have been coated by electrodeposition, subjected the fuel pipes as a whole to salt spray corrosion tests, and examined in detail the states of corrosion.

As a result, they discovered that a location inside of a crevice where no coating film was formed had much severer corrosion damage than a location where even just a little coating film was formed.

This difference in the state of formation of a coating film inside of a crevice was thought to be dependent on the crevice shape. Therefore, next, to clarify this effect more, the inventors ran experiments using coupon samples with shapes of crevices changed in various ways.

As a result, the inventors discovered that if making the opening amount of a crevice greater, a coating film would be formed inside the crevice as well and corrosion would be suppressed. They set a limit value for the opening amount and established specific means for satisfying this condition.

The present invention is constituted based on the above discovery and has as its gist the following:

(1) A fuel pipe comprised of a steel pipe member which is formed from a steel pipe having as a material a ferritic stainless steel which contains, by mass %, C: 0.015% or less, Si: 0.01 to 0.50%, Mn: 0.01 to 0.50%, P: 0.050% or less, S: 0.010% or less, N: 0.015% or less, Al: 0.010 to 0.100%, and Cr: 13.0 to 18.0% and, further, one or both of Ti: 0.03 to 0.30% and Nb: 0.03 to 0.30%, and having a balance of Fe and unavoidable impurities, and a metal fitting part which is attached to the steel pipe member, the metal fitting part and the steel pipe member having between them a crevice structure at the surface which the structure is exposed to a salt spray environment, an opening amount at a crevice part of the crevice structure being 0.2 mm or more, and an inside of the crevice part being coated by electrodeposition.

(2) The fuel pipe as set forth in (1), characterized by further containing, by mass %, one or both of B: 0.0002% to 0.0050% and Sn: 0.01 to 0.50%

(3) The fuel pipe as set forth in (1) or (2), characterized in that the metal fitting part is made of a material with a component composition which is within the scope of the component composition of the steel pipe member as set forth in claim 1 or 2.

(4) A method of production of a fuel pipe as set forth in any one of (1) to (3), the method of production of a fuel pipe characterized by comprising providing a projection of a height of 0.2 mm or more at a surface of the metal fitting part, which is attached to the steel pipe member, which faces the steel pipe member and attaching the metal fitting to the steel pipe member in a state with the projection placed inside the crevice.

(5) The method of production of a fuel pipe as set forth in (4), characterized in that the method of attaching the metal fitting part to the steel pipe member is welding or brazing.

Advantageous Effects of Invention

According to the present invention, it is possible to stably secure salt spray corrosion resistance while providing an inexpensive fuel pipe.

BRIEF DESCRIPTION OF DRAWINGS

FIG. 1(a) is a view which shows the state of attachment, by welding, of metal fittings 13 for bundling a main pipe 11 (steel pipe member) and a breather tube 12 (steel pipe member) and fastening them to a chassis and of the formation of crevice structures. FIG. 1(b) is a view which schematically shows a cross-section of the part attaching a metal fitting to the main pipe of FIG. 1(a).

FIG. 2(a) is a view which shows the state of attachment, by superposing over a metal plate of a t0.8×70×70 mm size, a metal plate of a t0.8×40×40 mm size and spot welding the center part. FIG. 2(b) shows a A-N cross section view for the spot welding test piece of FIG. 2(a).

FIG. 5(a) is a view which shows projections that are formed in advance at three locations on the surface of a small sheet which faces a large sheet. FIG. 5(b) shows a A-A' cross section view of FIG. 5(a).

DESCRIPTION OF EMBODIMENTS

Below, the present invention will be explained in detail.

Figure 1:
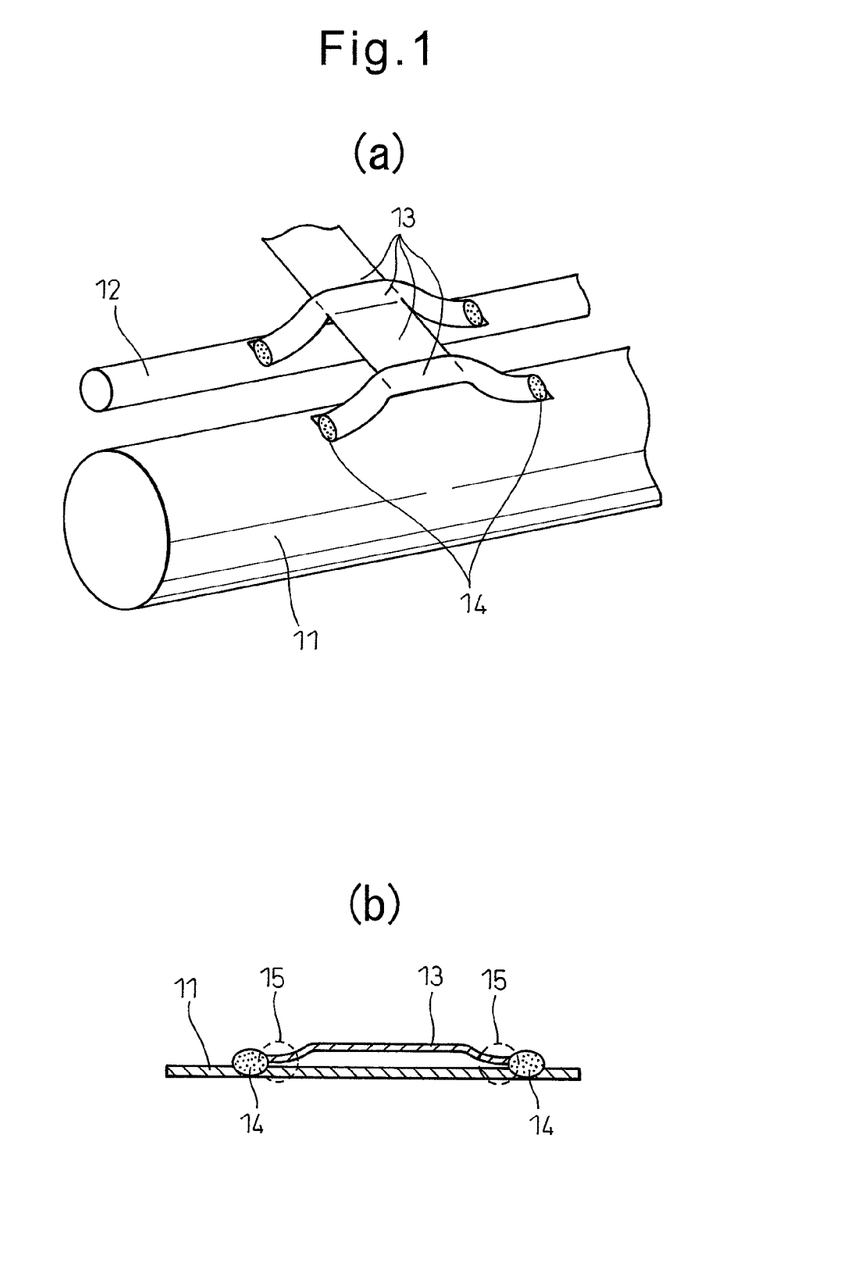
FIG. 1 is a view which shows an example of crevice structures which are present at a fuel pipe.

A fuel pipe includes crevice structures such as illustrated in FIG. 1.

FIG. 1(a) shows the state of attachment, by welding, of metal fittings 13 for bundling a main pipe 11 (steel pipe member) and a breather tube 12 (steel pipe member) and fastening them to a chassis and of the formation of crevice structures. Near the weld zones (14) of the metal fitting part 13 with the main pipe 11 or breather tube 12, crevices 15 are formed.

FIG. 1(b) is a view which schematically shows a cross-section of the part attaching a metal fitting to the main pipe of (a).

Note that, in FIG. 1(b), between the left and right crevices 15, in other words, near the centers of the main pipe 11 and metal fitting part 13 as well, the main pipe 11 and the metal fitting part 13 are not in contact. A space is present between them. In the present invention, however, a "crevice" designates a crevice 15 near a weld zone, while a "crevice part" designates a location near a crevice 15 near a weld zone.

Formation of an electrodeposition coating film inside of such a crevice is usually difficult. This is because the crevice opening amount is too small, so the electrodeposition coating solution cannot penetrate inside the crevice.

However, if increasing the opening amount, the coating solution can penetrate the inside so a coating film is formed in the crevice. If a coating film is formed, the corrosion resistance is also secured. This was proved by the following test.

First, samples changed in crevice opening amount in various ways were used for electrodeposition coating to investigate in detail the relationship between the state of formation of a coating film inside a crevice and the crevice opening amount.

Each crevice sample was prepared by superposing over a metal plate (23) of a t0.8×70×70 mm size a metal plate (24) of a t0.8×40×40 mm size and spot welding the center part with a weld nugget (21).

Figure 2:
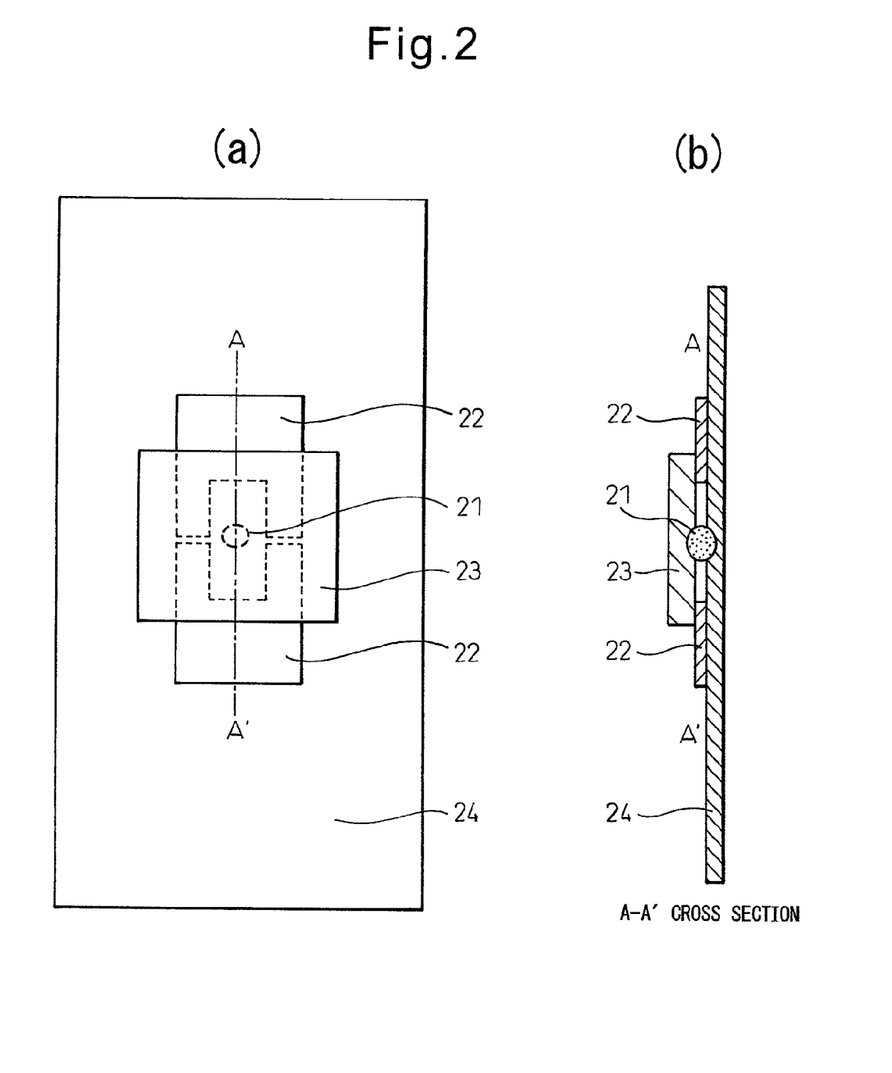
FIG. 2 is a view which schematically shows the shape of a spot welding test piece which is changed in opening amount of crevices.

The crevice opening amount of the crevice sample, as shown in FIG. 2, was changed by inserting one or more pieces of foil or sheets of a thickness of 0.1 to 1.0 mm before welding as spacers (22) (U-shaped) and pulling out the spacers after welding.

The "crevice opening amount" referred to here is defined as the penetratable thickness of metal foil which was measured by the method of inserting metal foil of a minimum unit thickness of 10 μm and a width of 5 mm into a crevice by a 0.5 mm penetration depth. The average value of four measurement values was used.

As the electrodeposition coating, cationic electrodeposition coating was performed. For the coating, PN-110 made by Nippon Paint was used. The bath temperature was 28° C., a coating voltage of 170V was used for energization, and conditions were selected so that the coating film thickness at the general parts became 20 to 25 μm. The baking conditions were made 170° C.×20 minutes.

After the end of the coating, the inside of the crevice was examined visually and the state of formation of the coating was evaluated. The case where at least 50% of the area at the inside of the crevice was coated was scored as "B", the case where the coated area was less than 50% as "C", and the case where the entire area at the inside of the crevice was coated as "A".

Figure 3:
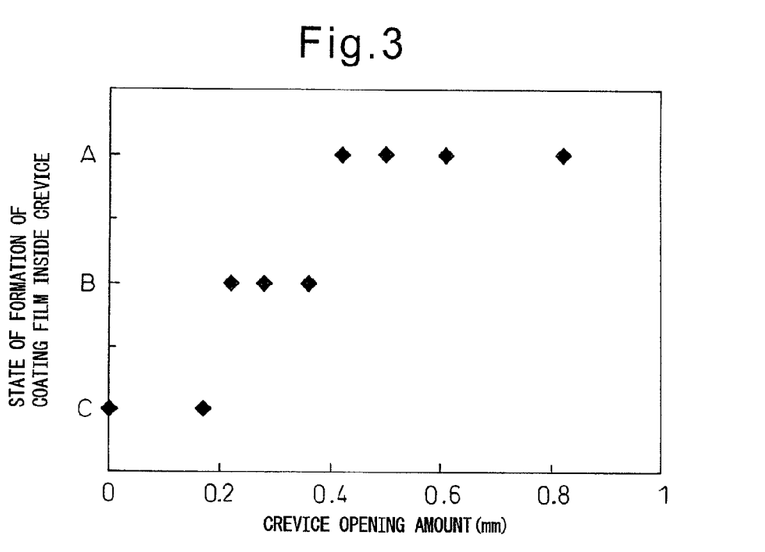
FIG. 3 is a view which shows the relationship between an opening amount of a crevice and the state of formation of a coating film inside of a crevice.

An example of the test results is shown in FIG. 3. From the results, it is learned that with an opening amount of 0.2 mm or more, a thin coating film is formed inside of the crevice, while with 0.4 mm or more, a coating film equal to the general parts is formed even inside of the crevice.

Next, this electrodeposition coated crevice sample was examined for corrosion resistance. The material was made ferritic stainless steel sheet of a thickness of 0.8 mm changed in steel components in various ways. The effects of the steel components were also considered.

A crevice sample was prepared by a method similar to that explained above, was coated by electrodeposition, then was used for a cyclic corrosion test.

As the corrosion test, a salt spray environment was envisioned and a JASO mode cyclic corrosion test (JASO-M609-

91 cyclic corrosion test (salt spraying: 5% NaCl spray, 35° C.×2 hr, drying: relative humidity 20%, 60° C.×4 hr, humidity: relative humidity 90%, repeated 50° C.×2 hr)) was performed for 300 cycles.

After the end of the test, the depth of corrosion at the inside of the crevice was measured by the microscope focal depth method.

Figure 4:
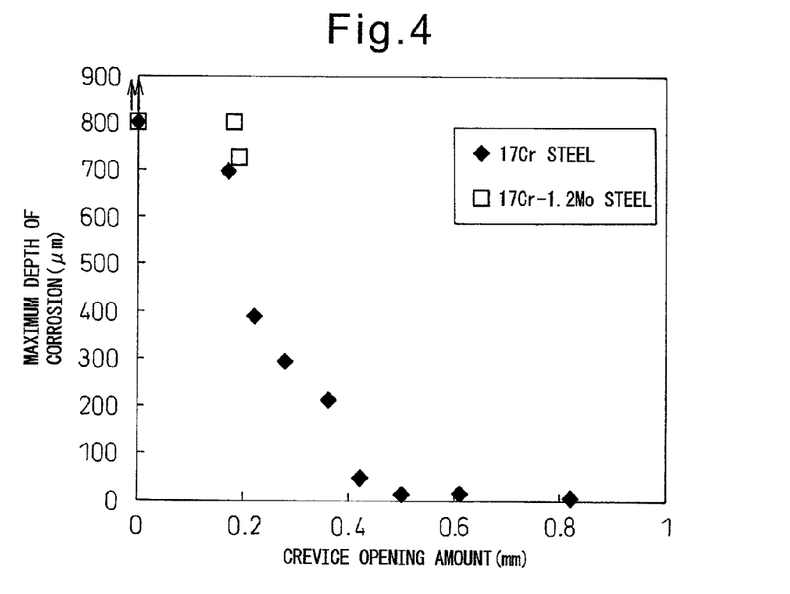
FIG. 4 is a view which shows the relationship between an opening amount of a crevice and crevice corrosion.

An example of the test results is shown in FIG. 4. From the results, it is learned that when the crevice opening amount is 0.2 mm or more and a coating film is formed inside of the crevice, so long as not using a material which is remarkably inferior in corrosion resistance, a sufficient corrosion resistance is obtained. Note that the arrow marks in FIG. 4 indicate that the maximum depth of corrosion is larger than 800 μm.

In particular, when the crevice opening amount is 0.4 mm or more, a remarkable effect of improvement of the corrosion resistance is obtained.

Further, even with a high grade material such as SUS436L, if the coating film is insufficiently formed, the inside of the crevice will be corroded quite a bit. It was proven that it is wiser to use a low grade material and form a sufficient coating film inside the crevice.

From these results, in the fuel pipe of the present invention, the opening amount of the crevice part is made 0.2 mm or more. The preferable opening amount is 0.4 mm or more.

Next, the material of the steel pipe member will be explained. Note that in the present invention, the "fuel pipe body" means the steel pipe members, that is, the main pipe and the breather tube inside of which the fuel gas is filled.

In the present invention, the contents of alloying elements are smaller than with SUS436L. Mo of course and also Ni, Cu, and other corrosion resistance-improving elements are not contained. The invention is characterized by being an inexpensive material. Specifically, ferritic stainless steel which is comprised of the following component composition is used as the material.

C, N: C and N are elements which become the case of grain boundary corrosion in the weld heat affected zone and cause the corrosion resistance to deteriorate. Further, they cause the cold workability to deteriorate. For this reason, the contents of C and N should be limited to as low levels as possible. C and N have to be made 0.015% or less, more preferably, 0.010% or less. Note that, the lower limits are not particularly defined, but if considering the refining costs, C is preferably made 0.0010% or more and N is preferably made 0.0050% or more.

Si: Si is useful as a deoxidizing element in the refining process and is included in 0.01% or more. On the other hand, it causes the workability to deteriorate, so should not be included in a large amount. The content is made 0.50% or less. The preferable range is 0.10 to 0.30%.

Mn: Mn is also included as a deoxidizing element and S-fixing element in 0.01% or more. Mn also causes the workability to deteriorate, so should not be included in a large amount. The content is made 0.50% or less. The preferable range is 0.10 to 0.30%.

P: P is an element which causes the workability to remarkably deteriorate. For this reason, the content of P is preferably as low a level as possible. The allowable content is made 0.050% or less, preferably 0.030% or less.

S: S is an element which causes the corrosion resistance to deteriorate, so the content of S is preferably as low a level as possible. The allowable content is made 0.010% or less, preferably 0.0050% or less.

Cr: Cr is a basic element which secures the corrosion resistance. Inclusion of a suitable amount is essential, so 13.0% or more is included. Cr is an element which causes the workability to deteriorate. Further, from the viewpoint of suppressing the alloying cost, the content is made 18.0% or less. The preferable range of the Cr content is 15.0 to 17.5%, more preferably 16.5 to 17.5%.

Al: Al is useful as a deoxidizing element and is included in 0.010% or more. It causes the workability to deteriorate, so should not be included in a large amount. The content is made 0.100% or less, preferably 0.070% or less.

The steel pipe member of the fuel pipe of the present invention contains one or both of Ti and Nb.

Ti: Ti has the action of fixing the C and N as carbonitrides and suppressing grain boundary corrosion. For this, 0.03% or more is included. However, even if excessively included, the effect becomes saturated and the workability is impaired, so the content is made 0.30% or less. The content of Ti is preferably 5 to 30 times the total content of C and N. More preferably, the content is 10 to 25 times the total content of C and N.

Nb: Nb, like Ti, has the action of fixing the C and N as carbonitrides and suppressing grain boundary corrosion, so 0.03% or more is included. However, even if excessively included, the workability is impaired, so the content is made 0.30% or less. The content of Nb is preferably 5 to 30 times the total content of C and N. More preferably, the content is 10 to 20 times the total content of C and N.

B: B is an element which is useful for preventing secondary working embrittlement and hot working deterioration and an element which has no effect on corrosion resistance. For this reason, as needed, 0.0002% or more is included. If including 0.0050% or more, conversely the hot workability is degraded, so the content is made 0.0050% or less, preferably 0.0020% or less.

Sn: Sn is an element which is useful for improving the corrosion resistance by a small amount of content and is included as needed in a range not detracting from the inexpensive cost. If the content is less than 0.01%, the effect of improvement of the corrosion resistance does not appear, while if over 0.50%, the increase in costs becomes marked and the workability also falls, so the content is made 0.01 to 0.50%, preferably 0.05 to 0.40%.

The stainless steel which is comprised of the above component composition is smelted and refined in a converter or electric furnace etc., then the resultant steel slab is made into steel sheet by the usual method of production of stainless steel sheet including hot rolling, pickling, cold rolling, and finishing pickling. Further, this steel sheet is used as a material to produce welded pipe by electrical resistance welding, TIG welding, laser welding, or another usual method of production of stainless steel pipe.

This stainless steel pipe is made into a fuel pipe through usual shaping and assembly processes such as bending, enlargement, drawing, and other cold plastic working, spot welding, projection welding, MIG welding, TIG welding, and other welding or brazing, and attachment of various fittings by nuts and bolts.

The material of the metal fitting parts is preferably the same material as the steel pipe members. It tends to be thought that even if the metal fitting parts are corroded, the fuel inside of the fuel pipe will not leak out, but the corrosion of the metal fitting parts makes the environment at the inside of the crevice harsher and as a result causes and accelerates crevice corrosion at the steel pipe member side.

Next, the method of production of a fuel pipe of the present invention will be explained.

The inventors studied the method of securing a crevice opening amount of 0.2 mm or more. As the method of securing the opening amount, the above-mentioned method of inserting and removing spacers may also be used, but this is troublesome, so in a mass production process, a more efficient method is preferable.

Figure 5:
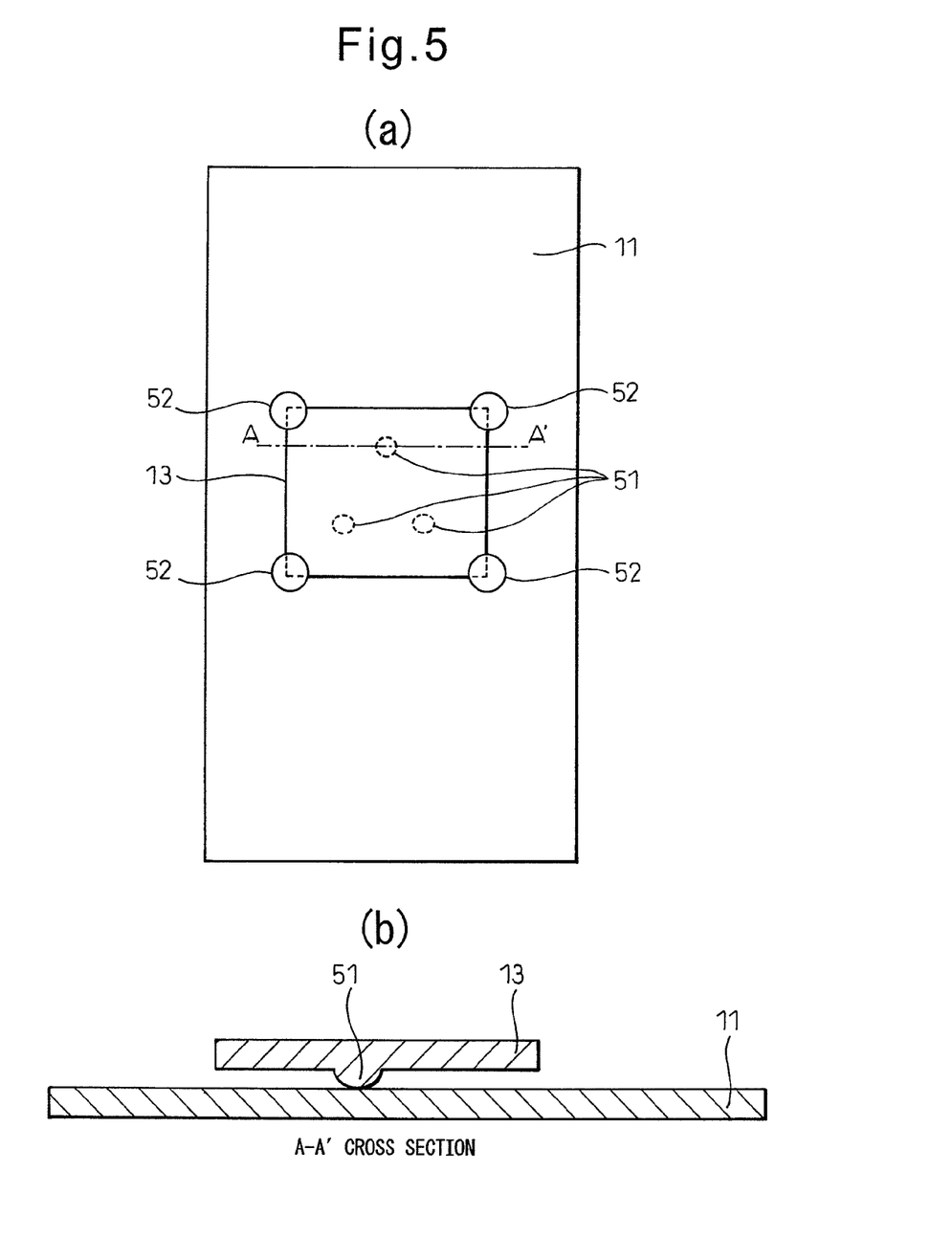
FIG. 5 is a view which schematically shows the shape of a crevice test piece with projections.

Therefore, special measures are taken in advance at a metal fitting which is to be attached to a steel pipe member. That is, as illustrated in FIG. 5, projections 51 are provided at the surface of a metal fitting part 13 which faces a steel pipe member (in FIG. 5, the main pipe 11). By making the heights of the projections 51 0.2 mm or more, it is possible to make the distance between the metal fitting 13 and the steel pipe member when attaching the metal fitting 13 to the steel pipe member, that is, the crevice opening amount, 0.2 mm or more.

There are preferably a plurality of projections. To make all of the projections contact the steel pipe member surface and stabilize the opening amount, contact at three points is preferable.

The shape of each projection is not particularly prescribed, but making the cross-sectional shape of the front end part semispherical in shape is preferable. If the front end part of the projection is flat, the contact of the projection to the steel pipe member surface becomes planar contact and a microscopic crevice is formed at the inside of the crevice, but if the front end part of the projection is semispherical, the contact of the projection to the steel pipe member surface becomes point contact and the contact part can be easily coated by electrodeposition.

This projection can be formed by using a press or other usual plastic working method. For example, it is possible to just strike the opposite surface to the projection forming surface by a punch.

The method of attachment of this metal fitting part with projections to the steel pipe member may be a method which is usually used in production of fuel pipes (for example, brazing, MIG welding, TIG welding, spot welding, fastening using bolts and nuts, etc.) However, when using a welding method, it is necessary to prevent the projecting parts from becoming connected parts. If the projections strike connecting parts, at the time of welding, the projections will deform and be eliminated and the required crevice opening amount will no longer be able to be secured.

EXAMPLES

Examples will be used as the basis to explain the present invention in more detail.

Stainless steel of each of the compositions which are shown in Table 1 was smelted in a 150 kg vacuum melting furnace, cast into a 50 kg steel ingot, then run through heating, hot rolling, hot rolled sheet annealing, pickling, cold rolling, annealing, and finishing pickling steps to prepare a thickness 0.8 mm steel sheet.

Preparation of Crevice Sample A>

From this steel sheet material, a large sheet of t0.8×70×70 m size and a small sheet of t0.8×40×40 m size were taken. The large sheet simulated the steel pipe member, while the small sheet simulated the metal fitting part.

These two sheets were superposed and the center parts were spot welded to prepare a crevice sample (A). In preparing the sample, the crevice opening amount, as shown in FIG. 2, was changed by inserting one or more pieces of foil or sheets of a thickness of 0.1 to 1.0 mm before welding as spacers and pulling out the spacers after welding.

The "crevice opening amount" referred to here is defined as the penetratable thickness of metal foil which was measured by the method of inserting metal foil of a minimum unit thickness of 10 μm and a width of 5 mm into a crevice by a 0.5 mm penetration depth. Four locations at the centers of the four sides of the small sheet were measured and an average was obtained for the four measured values. Test pieces where the value of the difference of the maximum value and minimum value of the measured values at the four locations divided by the average value of the four points is 1.0 or more were excluded from the measurements.

<Preparation of Crevice Sample B>

From the steel sheet material, a large sheet of t0.8×70×70 mm size and a small sheet of t0.8×40×40 m size were taken (the large sheet simulated the steel pipe member, while the small sheet simulated the metal fitting part).

These two sheets were superposed and the four corner parts of the small sheet were brazed to prepare a crevice sample (B). In the preparation of the sample, as shown in FIG. 5, projections were formed in advance at three locations on the surface of the small sheet which faces the large sheet. The projections were formed by making a punch strike the opposite surface to the surface which faces the large sheet.

The heights of the projections were measured by a laser microscope at three locations. The average value was used as the representative value. After the end of brazing, the crevice opening amount was measured by the same method as the case of the crevice sample A.

Next, the crevice samples A and B were coated by cationic electrodeposition. For the coating, PN-110 made by Nippon Paint was used. The bath temperature was 28° C., a coating voltage of 170V was used for energization, and conditions were selected so that the coating film thickness at the general parts became 20 to 25 μm. The baking conditions were made 170° C.×20 minutes.

TABLE 1

| | | Component composition (mass %) | | | | | | | | | | | | |
|---|---|---|---|---|---|---|---|---|---|---|---|---|---|---|
| Class | No. | C | Si | Mn | P | S | Al | Cr | Ti | Nb | N | B | Mo | Sn | Remarks |
| Inv. ex. | E01 | 0.0031 | 0.13 | 0.15 | 0.017 | 0.0008 | 0.052 | 17.11 | 0.211 | — | 0.0062 | 0.0005 | — | — | |
| | E02 | 0.0042 | 0.14 | 0.21 | 0.018 | 0.0011 | 0.051 | 17.01 | 0.038 | 0.151 | 0.0071 | — | — | — | |
| | E03 | 0.0035 | 0.10 | 0.08 | 0.019 | 0.0009 | 0.049 | 15.03 | 0.198 | — | 0.0068 | — | — | — | |
| | E04 | 0.0038 | 0.45 | 0.40 | 0.017 | 0.0011 | 0.021 | 14.01 | 0.205 | — | 0.0075 | — | — | — | |
| | E05 | 0.0028 | 0.11 | 0.09 | 0.018 | 0.0091 | 0.052 | 13.05 | 0.201 | — | 0.0073 | — | — | — | |
| | E06 | 0.0049 | 0.22 | 0.27 | 0.020 | 0.0021 | 0.035 | 16.80 | — | 0.165 | 0.0086 | — | — | — | |
| | E07 | 0.0036 | 0.25 | 0.31 | 0.021 | 0.0017 | 0.046 | 14.01 | — | 0.179 | 0.0068 | — | — | 0.11 | |
| | E08 | 0.0034 | 0.25 | 0.30 | 0.020 | 0.0015 | 0.041 | 14.05 | 0.041 | 0.153 | 0.0076 | — | — | 0.10 | |
| | E09 | 0.0044 | 0.24 | 0.35 | 0.019 | 0.0012 | 0.028 | 16.01 | 0.191 | — | 0.0071 | — | — | 0.31 | |
| | E10 | 0.0032 | 0.20 | 0.25 | 0.021 | 0.0011 | 0.041 | 16.91 | 0.021 | 0.181 | 0.0065 | — | — | 0.12 | |
| | E11 | 0.0035 | 0.20 | 0.24 | 0.021 | 0.0009 | 0.045 | 17.21 | 0.196 | — | 0.0063 | 0.0004 | — | 0.05 | |
| Comp. ex. | X01 | 0.0028 | 0.10 | 0.09 | 0.021 | 0.0011 | 0.069 | 17.15 | 0.211 | — | 0.0067 | — | 1.19 | — | SUS436L |
| | X02 | 0.0029 | 0.45 | 0.25 | 0.020 | 0.0009 | 0.061 | 11.05 | 0.190 | — | 0.0069 | — | — | — | |

Underlines indicate outside scope of present invention

After the end of the coating, the weld zone or brazed part (52) of the crevice samples A and B was removed, the inside of each crevice was examined visually, and the state of formation of the coating film was evaluated. The case where at least 50% of the area at the inside of the crevice was coated was scored as "B", the case where the coated area was less than 50% as "C", and the case where the entire area at the inside of the crevice was coated as "A".

Further, after the end of coating, the crevice samples A, B were sealed at the back end faces of the large sheets, then subjected to a JASO-M609-91 cyclic corrosion test simulating a salt spray environment (salt spray: 5% NaCl spray, 35° C.×2 hr, drying: relative humidity 20%, 60° C.×4 hr, wetting: relative humidity 90%, 50° C.×2 hr repetition).

The test period was made 300 cycles. After the end of the test, the weld zone or brazed part of the sample was worked and removed to expose the inside of the crevice, the sample was dipped in a paint remover to remove the coating film, the sample was dipped in a rust remover to remove the rust, then the depth of corrosion inside the crevice was measured by the microscope focal depth method. 10 points were measured and the maximum value was used as the representative value. A sample with a maximum corrosion depth of 400 μm or less was evaluated as "good".

The histories, methods of evaluation, and results of evaluation of the samples are shown in Table 2.

TABLE 2

| Class | No. | Material | Crevice sample class | Projection height (mm) | Crevice opening (mm) | State of formation of coating film inside crevice | Maximum corrosion depth (μm) |
|---|---|---|---|---|---|---|---|
| Inv. ex. | 1 | E01 | A | — | 0.22 | B | 391 |
| | 2 | E01 | A | — | 0.28 | B | 294 |
| | 3 | E01 | A | — | 0.36 | B | 213 |
| | 4 | E01 | A | — | 0.42 | A | 51 |
| | 5 | E01 | A | — | 0.50 | A | 15 |
| | 6 | E01 | A | — | 0.61 | A | 19 |
| | 7 | E01 | A | — | 0.82 | A | 11 |
| | 8 | E01 | B | 0.214 | 0.23 | B | 345 |
| | 9 | E01 | B | 0.314 | 0.33 | B | 224 |
| | 10 | E01 | B | 0.429 | 0.45 | A | 12 |
| | 11 | E01 | B | 0.501 | 0.51 | A | 18 |
| | 12 | E02 | B | 0.265 | 0.28 | B | 250 |
| | 13 | E02 | B | 0.468 | 0.47 | A | 19 |
| | 14 | E03 | B | 0.251 | 0.26 | B | 301 |
| | 15 | E03 | B | 0.478 | 0.48 | A | 19 |
| | 16 | E04 | B | 0.256 | 0.27 | B | 284 |
| | 17 | E04 | B | 0.515 | 0.53 | A | 29 |
| | 18 | E05 | B | 0.267 | 0.27 | B | 265 |
| | 19 | E05 | B | 0.478 | 0.48 | A | 51 |
| | 20 | E06 | A | — | 0.27 | B | 250 |
| | 21 | E06 | B | 0.335 | 0.35 | B | 221 |
| | 22 | E07 | A | — | 0.42 | A | 14 |
| | 23 | E07 | B | 0.258 | 0.26 | B | 211 |
| | 24 | E08 | A | — | 0.39 | A | 40 |
| | 25 | E08 | B | 0.265 | 0.27 | B | 202 |
| | 26 | E09 | A | — | 0.43 | A | 12 |
| | 27 | E09 | B | 0.254 | 0.26 | B | 209 |
| | 28 | E10 | A | — | 0.41 | A | 11 |
| | 29 | E10 | B | 0.259 | 0.27 | B | 190 |
| | 30 | E11 | A | — | 0.25 | B | 201 |
| | 31 | E11 | B | 0.268 | 0.27 | B | 198 |
| Comp. ex. | 101 | E01 | A | — | <u>≤0.01</u> | C | >800 |
| | 102 | E01 | A | — | <u>0.17</u> | C | 698 |
| | 103 | <u>X01</u> | A | — | <u>≤0.01</u> | C | 691 |
| | 104 | <u>X01</u> | A | — | <u>0.18</u> | C | 682 |
| | 105 | <u>X01</u> | B | 0.187 | <u>0.19</u> | C | 726 |
| | 106 | <u>X02</u> | A | — | 0.22 | C | >800 |
| | 107 | <u>X02</u> | A | — | 0.43 | C | 726 |
| | 108 | <u>X02</u> | B | 0.256 | 0.28 | C | >800 |
| | 109 | <u>X02</u> | B | 0.265 | 0.28 | B | 751 |
| | 110 | <u>X02</u> | B | 0.465 | 0.47 | A | 669 |

Underlines indicate outside scope of present invention

Comparative Example Nos. 103 to 105 show results of a test in the case of using the current material (SUS436L). The crevice opening amounts were small, so even with SUS436L, coating films were insufficiently formed in the crevices and severe crevice corrosion occurred.

Comparative Example Nos. 106 to 110 show results of a material of 11Cr steel outside the scope of the present invention. Even if the amounts of crevice opening are sufficient and coating films can be formed inside the crevices, the materials are insufficient in corrosion resistance. Corrosion proceeds under the coating films and finally leads to severe crevice corrosion.

Comparative Example Nos. 101 and 102 satisfy the requirements of the present invention in materials, but have crevice opening amounts outside the scope of the present invention, so satisfactory crevice corrosion resistance could not be obtained.

Invention Example Nos. 1 to 31 satisfy the requirements of the present invention in both the requirements of the materials and the crevice opening amounts and were confirmed to have more superior crevice corrosion resistances than under current conditions (corresponding to Comparative Example No. 103).

INDUSTRIAL APPLICABILITY

According to the present invention, it is possible to stably secure salt spray corrosion resistance while providing an inexpensive fuel pipe, so the industrial applicability is great.

REFERENCE SIGNS LIST 11 main pipe (steel pipe member)
12 breather tube (steel pipe member)
13 metal fitting part
14 weld zone
15 crevice
21 weld nugget
22 spacer
23 metal plate
24 metal plate
51 projection
52 brazed part

The invention claimed is:

1. A fuel pipe comprised of a steel pipe member which is formed from a steel pipe having as a material a ferritic stainless steel which contains, by mass %,
   C: 0.015% or less,
   Si: 0.01 to 0.50%,
   Mn: 0.01 to 0.50%,
   P: 0.050% or less,
   S: 0.010% or less,
   N: 0.015% or less,
   Al: 0.010 to 0.100%, and
   Cr: 13.0 to 18.0% and
   further, one or both of
   Ti: 0.03 to 0.30% and
   Nb: 0.03 to 0.30%, and
   having a balance of Fe and unavoidable impurities, and
   a metal fitting part which is attached to said steel pipe member,
   said metal fitting part and said steel pipe member having between them a crevice structure at the surface which the structure is exposed to a salt spray environment,
   an opening amount at a crevice part of said crevice structure being 0.4 mm or more, and
   an inside of said crevice part being coated by electrodeposition,
   here, the "crevice opening amount" being the penetratable thickness of metal foil which was measured by the method of inserting metal foil of a minimum unit thickness of 10 μm and a width of 5 mm into a crevice by a 0.5 mm penetration depth.

2. The fuel pipe as set forth in claim 1, characterized by further containing, by mass %,
   B: 0.0002 to 0.0050%.

3. The fuel pipe as set forth in claim 1, characterized in that said metal fitting part is made of a material with a component composition which is within the scope of the component composition of the steel pipe member.

4. The fuel pipe as set forth in claim 2, characterized in that said metal fitting part is made of a material with a component composition which is within the scope of the component composition of said steel pipe member.

5. A method of production of a fuel pipe as set forth in claim 1, said method of production of a fuel pipe characterized by comprising
   providing a projection of a height of 0.2 mm or more at a surface of the metal fitting part, which is attached to the steel pipe member, which faces the steel pipe member and
   attaching said metal fitting to the steel pipe member in a state with the projection placed inside the crevice.

6. A method of production of a fuel pipe as set forth in claim 2, said method of production of a fuel pipe characterized by comprising
   providing a projection of a height of 0.2 mm or more at a surface of the metal fitting part, which is attached to the steel pipe member, which faces the steel pipe member and
   attaching said metal fitting to the steel pipe member in a state with the projection placed inside the crevice.

7. A method of production of a fuel pipe as set forth in claim 3, said method of production of a fuel pipe characterized by comprising
   providing a projection of a height of 0.2 mm or more at a surface of the metal fitting part, which is attached to the steel pipe member, which faces the steel pipe member and
   attaching said metal fitting to the steel pipe member in a state with the projection placed inside the crevice.

8. A method of production of a fuel pipe as set forth in claim 4, said method of production of a fuel pipe characterized by comprising
   providing a projection of a height of 0.2 mm or more at a surface of the metal fitting part, which is attached to the steel pipe member, which faces the steel pipe member and
   attaching said metal fitting to the steel pipe member in a state with the projection placed inside the crevice.

9. The method of production of a fuel pipe as set forth in claim 5, characterized in that the method of attaching said metal fitting part to said steel pipe member is welding or brazing.

10. The method of production of a fuel pipe as set forth in claim 6, characterized in that the method of attaching said metal fitting part to said steel pipe member is welding or brazing.

11. The method of production of a fuel pipe as set forth in claim 7, characterized in that the method of attaching said metal fitting part to said steel pipe member is welding or brazing.

12. The method of production of a fuel pipe as set forth in claim 8, characterized in that the method of attaching said metal fitting part to said steel pipe member is welding or brazing.

* * * * *